(12) United States Patent
Anderson et al.

(10) Patent No.: US 7,914,688 B2
(45) Date of Patent: Mar. 29, 2011

(54) METHOD FOR SEPARATING EMULSIONS

(75) Inventors: Kris Anderson, Belfast (GB); Markus Fanselow, Belfast (GB); John David Holbrey, Belfast (GB)

(73) Assignee: Petroliam Nasional Berhad (Petronas), Kuala Lumpur (MY)

( * ) Notice: Subject to any disclaimer, the term of this patent is extended or adjusted under 35 U.S.C. 154(b) by 783 days.

(21) Appl. No.: 11/921,273

(22) PCT Filed: Jun. 1, 2006

(86) PCT No.: PCT/GB2006/001998
§ 371 (c)(1),
(2), (4) Date: Nov. 29, 2007

(87) PCT Pub. No.: WO2006/131699
PCT Pub. Date: Dec. 14, 2006

(65) Prior Publication Data
US 2009/0101592 A1      Apr. 23, 2009

(30) Foreign Application Priority Data
Jun. 6, 2005   (GB) .................................. 0511649.6

(51) Int. Cl.
*B01D 17/04*   (2006.01)

(52) U.S. Cl. ...................... 210/748.07; 516/194; 422/21
(58) Field of Classification Search ............. 210/748.07, 210/748.01–748.1; 422/21; 516/194
See application file for complete search history.

(56) References Cited

U.S. PATENT DOCUMENTS

| 4,582,629 A * | 4/1986 | Wolf ............................ 516/143 |
| 6,077,400 A | 6/2000 | Kartchner |
| 2003/0157351 A1 | 8/2003 | Swatloski et al. |

OTHER PUBLICATIONS

International Search Report mailed Aug. 2, 2006.
Written Opinion of the International Searching Authority dated Aug. 2, 2006.

* cited by examiner

*Primary Examiner* — Walter D Griffin
*Assistant Examiner* — Cameron J Allen
(74) *Attorney, Agent, or Firm* — Nixon & Vanderhye

(57) ABSTRACT

A method for breaking an emulsion of an ionic liquid which is a salt that is in the liquid state at a temperature below 1500 C, and an oil, comprising the steps of (a) irradiating the emulsion with microwave radiation; (b) separating the emulsion into an ionic liquid phase and an oil phase; and (c) recovering at least one of the phases.

11 Claims, No Drawings

METHOD FOR SEPARATING EMULSIONS

This application is the U.S. national phase of International Application No. PCT/GB2006/001998 filed 1 Jun. 2006 which designated the U.S. and claims priority to GB 0511649.6 filed 6 Jun. 2005, the entire contents of each of which are hereby incorporated by reference.

The present invention relates to a method for separating emulsions of ionic liquids and oils.

Many ionic liquids readily separate from oils to form two phase systems. Such ionic liquids may be used for extracting sulfur containing compounds from gasoline or diesel (desulfurization), extracting olefins from alkanes, and as liquid catalysts for oligomerization and polymerization of olefins. However, in practice, many common ionic liquids form emulsions with oils on mixing, and the demulsification and separation of the ionic liquid and oil phases can be problematic.

The use of microwave radiation to aid demulsification of water-in-oil and oil-in-water emulsions is known. For example, U.S. Pat. No. 4,528,629 describes a method for enhancing the separation of hydrocarbon and water from an emulsion or dispersion thereof comprising the steps of subjecting said emulsion or dispersion to microwave radiation in the range of one millimeter to 30 centimetres and heating the microwave irradiated emulsion or dispersion to a separating temperature using conventional heating means. The method is said to be applicable to both oil external and water external systems i.e. water-in-oil and oil-in-water emulsions respectively. U.S. Pat. No. 6,077,400 relates to a method of breaking an oil-in-water emulsion feedstock into its constituent oil and water phases using radio frequency (RF) microwave energy. However, there are fundamental differences between water (a weakly ionized molecular liquid) and ionic liquids (comprised wholly of dissociated cations and anions). Accordingly, the solvent properties of water do not provide a guide to the solvent properties of ionic liquids or to their behaviour in biphasic systems, particularly with respect to the formation of ionic liquid/oil emulsions. Ionic liquids have been shown to readily absorb microwave radiation through dipole-dipole and ionic conductance mechanisms giving rise to exceptionally efficient heating and rapid local increases in temperature. This characteristic of ionic liquids has been utilized in their applications as solvents for synthesis (see Westman, "Preparation and use of ionic liquids in microwave-assisted chemical transformations", U.S. Pat. No. 6,596,130 Jul. 22, 2003) and for dissolving cellulose (see "Dissolution of cellulose with ionic liquids", R. P. Swatloski, S. K. Spear, J. D. Holbrey and R. D. Rogers, J. Amer. Chem. Soc., 2002, 124, 4974-4975; U.S. Pat. No. 6,808,557 and U.S. Pat. No. 6,824,599). However, none of these references deal with the separation of ionic liquid/oil emulsions nor the necessity for increasing or enhancing the rate of separation therefrom.

It has now been found that microwave irradiation of ionic liquid/oil emulsions may be used to effect demulsification and separation of the ionic liquid and oil phases.

Accordingly, the present invention relates to a method for breaking an emulsion of an ionic liquid which is a salt that is in the liquid state at a temperature below 150° C., and an oil, comprising the steps of
(a) irradiating the emulsion with microwave radiation;
(b) separating the emulsion into an ionic liquid phase and an oil phase; and
(c) recovering at least one of the phases.

Without wishing to be bound by any theory it is believed that microwave irradiation of the ionic liquid/oil emulsion induces or enhances breaking of the emulsion through preferential heating of the ionic liquid phase resulting in breaking of the interfacial film present in the emulsion and coalescence of the emulsion droplets. Thus, demulsification of ionic liquid/oil emulsions using microwave irradiation substantially improves both the extent of separation of the phases and the rate at which the phases separate.

The emulsion may be an "ionic liquid-in-oil emulsion" comprising droplets of a discontinuous ionic liquid phase dispersed in a continuous oil phase or an "oil-in-ionic liquid emulsion" comprising droplets of oil dispersed in a continuous ionic liquid phase. Suitably, the ionic liquid-in-oil emulsion contains from 1 to about 50% by weight ionic liquid based on the total weight of the emulsion. Suitably the oil-in-ionic liquid emulsion contains greater than 50% by weight ionic liquid. Preferably, the emulsion is an ionic liquid-in-oil emulsion. Suitably both phases resulting from the breaking of the emulsion are recovered.

By ionic liquid is meant a salt that is in the liquid state at a temperature below 150° C., preferably, at a temperature below 100° C. The ionic liquid salt is comprised wholly of dissociated ions and is therefore a conductor of electricity. Ionic liquids have substantially no vapour pressure and are consequently odorless. For a more detailed description of ionic liquids see J. L. Anthony, J. F. Brennecke, J. D. Holbrey, E. J. Maginn, R. A. Mantz, R. D. Rogers, P. C. Trulove, A. E. Visser and T. Welton, "Physicochemical Properties of Ionic Liquids" in Ionic Liquids in Synthesis, Wiley-VCH, Eds P. Wasserscheid and T. Welton. Other publications which give details of ionic liquids which may form emulsions treatable by the process of the present invention, include U.S. Pat. No. 6,596,130, U.S. Pat. No. 6,824,599, WO 02/079212 and WO 2004/016631. The contents of all prior art publications referred to herein are incorporated herein by reference.

Any ionic liquid capable of forming an emulsion with an oil may be present in the emulsion processed according to the invention. In general, the ionic liquid will be substantially insoluble in the oil phase and will not have significant surfactant properties. By "insoluble" in the oil phase is meant that the ionic liquid has a solubility in the oil phase of less than 100 ppm, preferably less than 50 ppm, more preferably, less than 25 ppm, for example, less than 10 ppm.

The oil phase of the emulsion may for example be selected from crude oils, crude oil blends, crude oil distillates, vegetable oils, animal oils, synthetic oils, lubricant oils and mixtures thereof.

It is envisaged that the emulsion may comprise minor amounts of water, for example, 0.1 to 5 weight % water. Some or all of the water may be absorbed into the ionic liquid phase of the emulsion.

The method of the present invention is particularly suitable for breaking unwanted emulsions that arise when an ionic liquid is employed as an extract phase or as a liquid catalyst. For example, crude oils or crude oil distillate fractions often contain naturally occurring surfactants. Accordingly, an emulsion may arise spontaneously when a mixture of the crude oil or crude oil distillate and an ionic liquid is subjected to shearing (thereby imparting the energy required to form the ionic liquid/oil emulsion). The ionic liquid phase of such spontaneously formed emulsions may have been contacted with the crude oil or crude oil distillate in order to extract unwanted components of the crude oil or crude oil distillate, for example, organic acids such as naphthenic acids, or sulfur containing, compounds. Where the oil is a lubricant, an emulsion may also arise when an ionic liquid is contacted with the lubricant in order to extract contaminants such as metal particles, metal ions or combustion residues, and the resulting mixture is subjected to shearing.

Microwave radiation is defined herein as electromagnetic radiation in the frequency range of 300 MHz to 300 GHz (having wavelengths in the range 1 to 1000 nm). The wavelength of the microwave radiation is preferably chosen so as to optimize the penetration of the microwave radiation into the emulsion. The penetration of the microwave radiation increases with increasing wavelength (and hence decreasing frequency). However, in practice, the frequency of microwave radiation that is licensed for use in industrial processes is restricted to 2.4 GHz and 0.6-0.7 GHz thereby avoiding the risk of the emitted microwave radiation disrupting communications equipment. The emulsion is subjected to microwave irradiation in step (a) for a time sufficient to break the emulsion. It has been found that microwave irradiation of the emulsion significantly reduces the time taken for separation of the ionic liquid and oil phases, for example, from days to minutes.

Suitably, the emulsion may be irradiated with microwave radiation in a tank where the residence time of the emulsion in the tank is 5 to 20 minutes. Alternatively, the emulsion may be irradiated as it flows through a tubular apparatus having a microwave reactor arranged such that microwaves penetrate radially into the flowing emulsion.

Suitably, the emulsion is subjected to microwave irradiation at ambient pressure. Suitably, the microwave radiation preferentially heats the ionic liquid phase of the emulsion to a temperature of at least 50° C., preferably, to a temperature in the range 60 to 100° C.

Suitably, the emulsion may be subjected to microwave irradiation in the presence of an additional heating source, an electrostatic field, an acoustic field, or combinations thereof in order to further enhance breaking of the emulsion.

Separation step (b) may be achieved by any means known to the person skilled in the art, for example, by centrifugation, gravity separation, hydrocyclone separation, electrostatic separation or combinations thereof. It is also envisaged that irradiation step (a) and separation step (b) may be carried out together. For example, the ionic liquid/oil emulsion may be subjected to microwave irradiation in a settling tank or in a centrifuge. Generally, the ionic liquid phase will be denser than the oil phase such that the emulsion separates into an upper oil layer and a lower ionic liquid layer.

Optionally, a demulsifier may be added to the emulsion prior to or during the irradiation step (a) to enhance the rate of demulsification. The demulsifier may be selected from any known demulsifier that is not degraded by microwave irradiation. Typically, the demulsifiers utilized during microwave irradiation step (a) will have a molecular weight in the range 500 to 5000, preferably 500 to 2000. In the case of an ionic liquid-in-oil emulsion, the demulsifier suitably has a hydrophilic-lipophilic balance value of above 9, preferably in the range 9 to 30, for example, 9 to 15. Demulsifiers which will not degrade when exposed to microwave irradiation include those which contain functional groups such as ethers, amines, ethyoxylated alcohols, sulfonates and mixtures thereof. A particularly preferred demulsifier is a phenolformaldehyde ethoxylated propoxylated resin. In the case of an oil-in-ionic liquid emulsion, the demulsifier suitably has a hydrophilic-lipophilic balance value of less than 8, preferably 3 to 6.

The amount of demulsifier added during microwave irradiation step (a) is preferably in the range of 5 to 100 ppm, preferably, 10 to 25 ppm. Additionally, a delivery solvent may be employed. Where the emulsion is an ionic liquid-in-oil emulsion, the delivery solvent is suitably miscible with the oil phase. Where the oil phase is a crude oil, the delivery solvent may for example be a crude oil distillate boiling in the range of about 70 to 450° C. Where the oil phase is a crude oil distillate fraction, the delivery solvent may for example be the crude oil distillate fraction or a component thereof. It is also envisaged that the delivery solvent may be a conventional solvent that is miscible with the oil, for example an alcohol, ether, or mixture thereof. The delivery solvent may be present in an amount of from 30 to 75% weight in the demulsifier. Where the emulsion is an oil-in-ionic liquid emulsion, the delivery solvent is suitably miscible with the ionic liquid phase.

The present invention will now be illustrated by reference to the following Examples.

EXAMPLE 1

1,3-dimethylimidazolium methyl sulfate was prepared as described in "Efficient, halide free synthesis of new, low cost ionic liquids: Alkylimidazolium salts containing methyl- and ethyl-sulfate anions", J. D. Holbrey, W. M. Reichert, R. P Swatloski, G. A. Broker, W. R. Pitner, K. R. Seddon and R. D. Rogers, Green Chem., 2002, 4, 407-413.

An emulsified mixture of 1,3-dimethylimidazolium methyl sulfate (2 mL) and crude oil from the Harding Field in the North Sea (2 mL) was irradiated with microwave radiation using a CEM Explorer™ laboratory microwave reactor resulting in separation of the emulsion into a pale straw colored lower ionic liquid layer and dark upper oil layer. The ionic liquid in oil emulsion had arisen spontaneously upon mixing the ionic liquid with the oil owing to the presence of naturally occurring surfactants in the Harding crude oil.

EXAMPLE 2

30 mL of Harding crude oil and 30 mL of 1-ethyl-3-methylimidazolium ethylsulfate were blended at 60° C., stirring with an overhead stirrer at 2000 rpm to form an emulsion.

2×2 mL samples were pipetted into microwave sample tubes. One tube was heated for 1 min in the microwave oven, and the control was heated in a water bath at 50° C. The sample heated in the microwave showed separation into two phases after one minute of heating. Over the same time period, the sample heated in a water bath showed only initial signs of ionic liquid and oil droplet formation, and required approximately 10 min. to achieve comparable separation.

EXAMPLE 3

7 emulsions containing a 1:2 mass ratio of crude oil from the Harding Field and an ionic liquid, were prepared and irradiated with microwave radiation using a CEM Explorer™ laboratory microwave reactor under the following conditions: power: 100 watts; ramp time: 60 seconds; hold time: 60 seconds; temperature: 80° C. The ionic liquids in the seven emulsions were prepared by methods similar to those described in "Ionic liquids in synthesis", Peter Wasserscheid, Tom Welton, First Edition, November 2002, ISBN: 3-527-30515-7-Wiley-VCH, and were: 1-ethyl-3-methylimidazolium methyl sulfate; 1-ethyl-3-methylimidazolium bis-trifluoromethanesulfonylimide; 1-octyl-3-methylimidazolium tetrafluoroborate; cholinium bis-trifluoromethanesulfonylimide; 1-hexyl-3-methylimidazolium hexafluorophosphate; 1,1-butylmethylpyrrolidinium bis-trifluoromethanesulfonylimide; and 1-H-3-methylimidazolium methanoate. In all cases, following irradiation, the emulsion separated into a lower ionic liquid layer and an upper, darker, oil layer.

The invention claimed is:

1. A method for breaking an emulsion of an ionic liquid which is a salt that is in the liquid state at a temperature below 150° C., and an oil, comprising the steps of
   (a) irradiating the emulsion with microwave radiation;
   (b) separating the emulsion into an ionic liquid phase and an oil phase; and
   (c) recovering at least one of the phases.

2. A method as claimed in claim 1, in which the emulsion is an ionic liquid-in-oil emulsion containing from 1 to 50% by weight ionic liquid based on the total weight of the emulsion, or an oil-in-ionic liquid emulsion containing from 50 to 99% by weight ionic liquid based on the total weight of the emulsion.

3. A method as claimed in claim 1, in which the ionic liquid is a salt which is in the liquid state at a temperature below 100° C.

4. A method as claimed in claim 1, in which the oil phase of the emulsion is selected from crude oils, crude oil blends, crude oil distillates, vegetable oils, animal oils, synthetic oils, lubricant oils and mixtures thereof.

5. A method as claimed in claim 1, in which the emulsion is one which has arisen following the use of the ionic liquid as an extract phase or as a catalyst.

6. A method as claimed in claim 1, in which in step (a) the irradiation with microwaves heats the ionic liquid phase of the emulsion to a temperature of at least 50° C.

7. A method as claimed in claim 6, in which in step (a) the irradiation with microwaves heats the ionic liquid phase of the emulsion to a temperature in the range 60 to 100° C.

8. A method as claimed in claim 1, in which in step (a) the emulsion is subjected to microwave irradiation in the presence of an additional heating source, an electrostatic field, an acoustic field, or a combination thereof.

9. A method as claimed in claim 1, in which irradiation step (a) and separation step (b) are carried out together.

10. A method as claimed in claim 1, in which a demulsifier is added to the emulsion prior to or during the irradiation step (a).

11. A method as claimed in claim 1, in which in step (c) both phases are recovered.

* * * * *